United States Patent
Schulz

(10) Patent No.: US 7,043,251 B1
(45) Date of Patent: May 9, 2006

(54) METHOD AND CONTROLLING THE SELECTION OF BASE STATIONS IN A CELLULAR RADIO TELECOMMUNICATIONS SYSTEM

(75) Inventor: Egon Schulz, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,414

(22) PCT Filed: Feb. 25, 2000

(86) PCT No.: PCT/DE00/00539

§ 371 (c)(1),
(2), (4) Date: Dec. 17, 2001

(87) PCT Pub. No.: WO00/51378

PCT Pub. Date: Aug. 31, 2000

(30) Foreign Application Priority Data

Feb. 26, 1999 (DE) .................................. 199 08 479

(51) Int. Cl.
*H04Q 7/20* (2006.01)
(52) U.S. Cl. .................... 455/450; 455/550.1; 455/551; 455/552.1; 455/426.1; 455/435.2; 455/435.1; 455/414.1

(58) Field of Classification Search ................ 455/450, 455/451, 452, 414.1, 432.1, 432.2, 435.2, 455/434, 436, 437, 438, 439, 440, 426.1, 455/426.2, 517, 445, 500, 403, 414.2, 551, 455/550.1, 552.1, 553.1, 558, 418, 419, 420, 455/432.3
See application file for complete search history.

(56) References Cited

U.S. PATENT DOCUMENTS

| 6,173,181 | B1* | 1/2001 | Losh ........................... 455/434 |
| 2001/0001089 | A1* | 5/2001 | Krishnamurthi et al. ..... 455/414 |
| 2002/0057667 | A1* | 5/2002 | Hamalainen et al. ........ 370/347 |

FOREIGN PATENT DOCUMENTS

EP 0 781 064 A2 6/1997

* cited by examiner

*Primary Examiner*—Keith Ferguson
(74) *Attorney, Agent, or Firm*—Bell, Boyd & Lloyd LLC

(57) ABSTRACT

In order to support the effective use of services in wireless telecommunications systems, radio devices are designed in such a way that they maintain at least two lists in which connection-relevant data of base stations are stored, separated according to the service which they support. In order to set up a connection, a base station is determined from the list according to the required service.

13 Claims, 2 Drawing Sheets

METHOD AND CONTROLLING THE SELECTION OF BASE STATIONS IN A CELLULAR RADIO TELECOMMUNICATIONS SYSTEM

BACKGROUND OF THE INVENTION

In the terminal equipment domain of telecommunications, radio paths are becoming increasingly important. Cordless telephones, mobile radio terminals and the wireless connection technology "RLL" (Radio in the Local Loop) or "WLL" (Wireless Local Loop) are well-known examples of this. With the aim of defining a standard for a high-performance and universal air interface, an air interface known as "DECT" (Digital Enhanced (formerly: European) Cordless Telecommunication) was defined at the instigation of European companies. The DECT standard is described in the documents ETS (European Telecommunication Standard) 300 175-1, . . . , Oct. 9, 1992 of the ETSI (European Telecommunication Standards Institute) and is known therefrom.

A DECT system allows up to 120 simultaneous connections between base stations and mobile units, which are furthermore understood to include not only mobile terminals but also, as for example in the wireless connection technology "Radio in the Local Loop", stationary system components which communicate with a base station via an air interface and which include the functional scope of a mobile unit. As such, up to 10 frequencies between 1.88 and 1.90 GHz are available and up to 12 simultaneous duplex voice connections (time slots, voice channels) can be implemented per frequency.

Furthermore, interworking between DECT and "ISDN" (Integrated Services Digital Network) is specified in the DECT standard. Along with the time slots (channels) at 32 kbit/s ("Full Slots") and 8 kbit/s ("Half Slots") required for voice connections, time slots with a transmission rate of 64 kbit/s provided to support ISDN are also specified.

Base stations and corresponding mobile units are generally known which, for faster data transmission of, for example, 64 kbit/s or to support DECT/ISDN interworking, support transmission rates of both 32 kbit/s "Full Slots" and 64 kbit/s "Double Slots." That is to say up to 6 channels with a transmission rate of 64 kbit/s, i.e. a maximum of 2 complete ISDN connections having two base channels "B-channel", each at 64 kbit/s, and one control channel "D-channel" at 16 kbit/s, are provided.

"Scanning" of local radio devices to determine free and occupied channels, which is carried out by all DECT devices at least every 30 seconds as a background process, is known from the DECT standard. The information determined in this way is stored in a list known as the RSSI ("Received Signal Strength Indication") list, where free channels with little interference are identified by high values and occupied channels with substantial interference are identified by low values, for subsequent selection. If a radio cell is supplied with radio resources by two base stations, or if these base stations partially cover a common radio coverage area (overlapping of radio cells), whereby the first base station supports only "Full Slots" and the second base station both "Full Slots" and "Double Slots", a mobile station which supports both "Full Slots" and "Double Slots" and which, for example, requires the voice transmission service, i.e. a transmission rate of 32 kbit/s ("Full Slots"), requires a facility to determine which base station provides this service.

In terms of a universal telecommunications system "Universal Mobile Telecommunication System" UMTS, it is also conceivable for two base stations to supply two different telecommunications systems, for example a first base station supplies a DECT radio area and a second base station supplies a "Global System for Mobile" GSM radio area, whereby the radio coverage areas totally or partially overlap each other for the implementation of the UMTS. Mobile units which support both systems, therefore, similarly require a facility to distinguish between these base stations.

An object to which the present invention is directed is to indicate a method for controlling the selection of base stations in a cellular radio telecommunications system, in which the radio transmission resources made available in the radio telecommunications system, in particular in an RLL or WLL system, are effectively used.

SUMMARY OF THE INVENTION

In the method according to the present invention, connection-relevant data are stored in at least one memory in at least one radio cell of a cellular radio telecommunications system by at least one radio device which supports at least one first service and one second service. Base stations signal which services they respectively support. Primary data records of base stations, which signal the support of the first service, are stored by the radio device in a first list, and secondary data records of base stations, which signal the support of the second service, are stored in the second list. The connection-relevant data are therefore stored in the lists and separated according to services. If the signaling changes, the lists are updated accordingly.

An advantage of the method according to the present invention is the storage, separated according to supported services, of the data of a number of base stations, which offer themselves as alternatives for the support of a specific service.

An advantage of a further development of the present invention is the guarantee that a connection is set up to the base station with the best transmission characteristics.

An advantage of another embodiment the present invention, in a further embodiment, a simplification of the method since the structuring of the list is carried out independently of measurements of the base stations.

An advantage of another embodiment is the simple and low-cost implementation of the method, since no additional measurements or data evaluation are required in order to determine the sequence of data records within a list.

An advantage of yet another embodiment of the present invention is the guarantee that a connection is set up.

Additional features and advantages of the present invention are described in, and will be apparent from, the following Detailed Description of the Invention and the Figures.

DETAILED DESCRIPTION OF THE INVENTION

Figure 1:
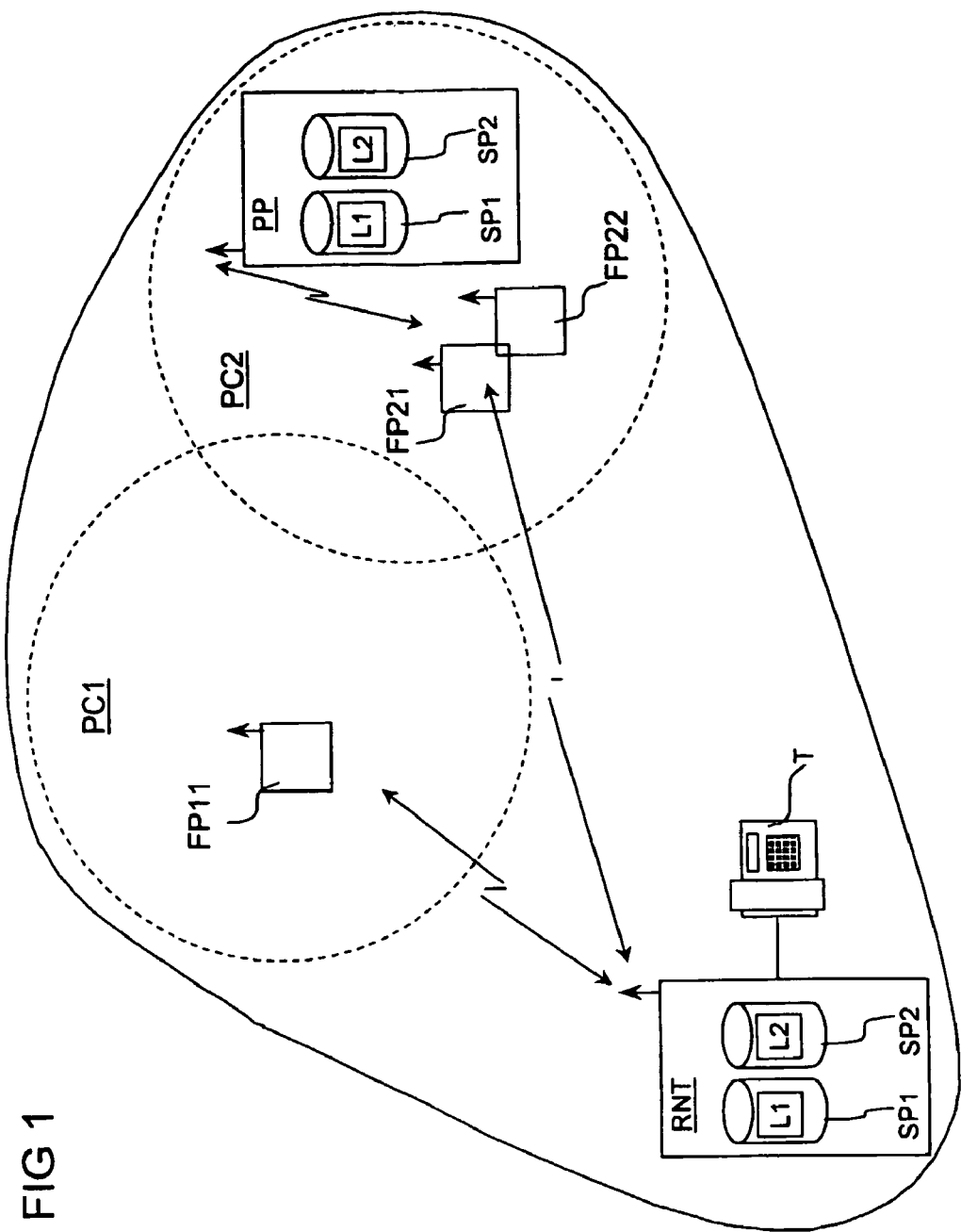
FIG. 1 shows a radio telecommunications system with base stations, mobile stations and a network termination designed as a mobile station.

FIG. 1 shows a telecommunications system designed as a DECT system with radio cells PC1 and PC2 designed as picocells. Information is transmitted, in each case, via a DECT air interface designed according to the DECT standard, via which the "DECT radio channel" wireless transmission medium is accessed through a combination of FDMA, TDMA and TDD access methods (Frequency Division Multiple Access/Time Division Multiple Access/Time Division Duplex). Ten carrier frequencies, each with a channel spacing of 1.728 MHz, are available in the frequency range between 1880 MHz and 1900 MHz (FDMA), whereby the time frame defined for each carrier is divided up into 24 time slots or channels (TDMA).

For transmitting voice data, DECT fixed parts FP11, FP21, FP22 use time slots with a transmission rate of 32 kbit/s (Full Slot), corresponding to a first service D1. Time slots with a transmission rate of 64 kbit/s, corresponding to the second service D2 (Double Slot), are used by the DECT fixed part FP22 above all for the transmission of packet data. A radio network termination RNT to which a telephone T is connected and a DECT mobile part PP can be connected in a wireless manner to the DECT fixed parts FP11, FP21, FP22 via the DECT air interface. The DECT mobile part PP and the radio network termination RNT similarly support the first service D1 of the DECT system and the second service D2 of the DECT system. The DECT mobile part PP and the radio network termination RNT store connection-relevant data of the DECT fixed parts FP11, FP12, FP21, FP22, which use "Full Slots", as primary data records in the form of a first list L1 in a first memory SP1 and connection-relevant data of the DECT fixed parts FP11, FP12, FP21, FP22, which use "Double Slots", as secondary data records in the form of a second list L2 in a second memory SP2.

Alternatively, it is also possible for the data records or lists L1, L2 to be stored in a single memory.

An alternative embodiment of the radio telecommunications system from FIG. 1 is provided if the first service D1 is made available within a first radio cell which, for example, has a radio range according to the DECT standard, and the second service D2 is made available within a second radio cell which, for example, has a radio range according to the GSM standard, whereby the DECT radio coverage area is partially or fully covered by the GSM radio coverage area in order to enable the implementation of a universal telecommunications system, for example UMTS. In this embodiment, the case may occur wherein the type of data in the first service D1 and in the second service D2 are the same, for example voice data, but differ in terms of the different radio ranges of the radio cells in which they are made available. The primary and secondary data records are then stored according to the radio ranges in the first list L1 or the second list L2.

In the event that the types of data transmitted in the first service D1 and in the second service D2 differ from one another (e.g., first service D1: voice data, second service D2: packet data) and are made available in radio cells with different radio ranges, the primary and secondary data rates can be stored in the first list L1 or second list L2 according to the radio range or on the basis of the service D1, D2 which is provided.

Figure 2:
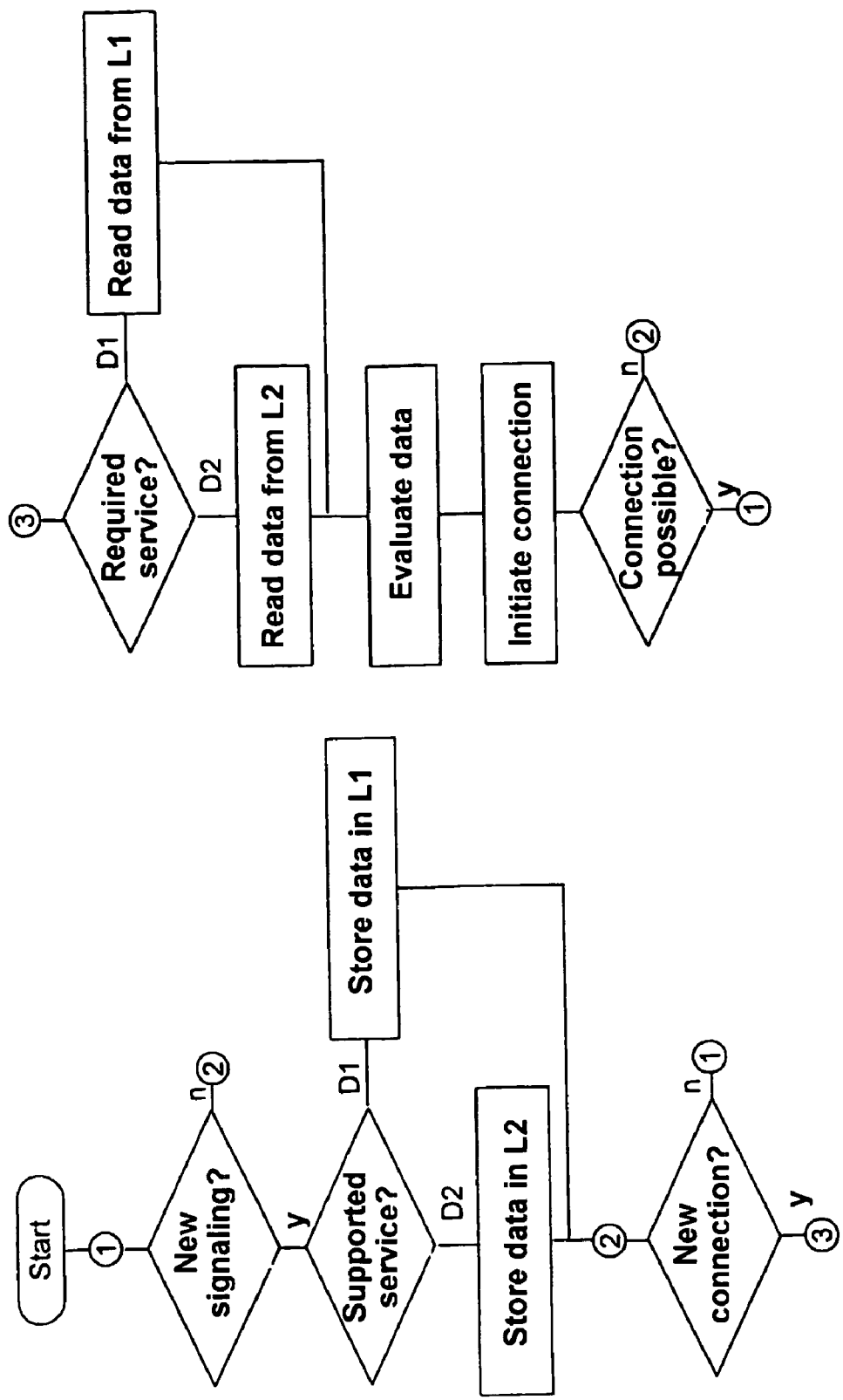
FIG. 2 shows a flow diagram of the method for selecting base stations in the radio telecommunications system according to FIG. 1.

In FIG. 2, the method for selecting base stations is described with reference to a flow diagram, the method being carried out in an arrangement according to FIG. 1 between the DECT fixed parts FP11, FP21, FP22, the DECT mobile part PP and the radio network termination RNT.

In the initial condition, first DECT fixed parts FP21, FP22 signal to the DECT mobile part PP and the radio network termination RNT which service D1, D2 they support. In addition, the radio network termination RNT receives the signaling of the supported service D1, D2 from the second DECT fixed part FP11. In the DECT mobile part PP and the radio network termination RNT, a check is first carried out to ascertain whether signaling has taken place; i.e., whether an update of the relevant list(s) L1, L2 is required.

If this is the case, the primary data records from the DECT fixed parts FP11, FP21, FP22 signaling the support of the first service D1 are stored in the form of the first list L1 in the memory SP1, SP2 and/or secondary data records from the DECT fixed parts FP11, FP21, FP22 signaling the support of the second service D2 are stored in the form of the second list L2 in the memory SP1, SP2. The sequence of the data records stored, or to be stored, in the lists L1, L2 is derived from the sequence in which the signaling is received.

Alternatively, the data records stored or to be stored can be arranged within the list L1, L2, according to transmission characteristics of the corresponding DECT fixed parts FP11, FP21, FP22, or according to ordering criteria based on the type of data records stored or to be stored; e.g., alphabetically or numerically.

If this is not the case, i.e. an update is not required, a connection request is expected.

If the DECT mobile part PP or the radio network termination RNT wishes to set up a telecommunications connection, a first data record of the primary or secondary data record is, in each case, read from the relevant list L1, L2 in order to initiate the connection set-up according to the required service D1, D2. The associated DECT fixed part FP11, FP21, FP22 is then determined from the data record and the connection to this DECT fixed part FP11, FP21, FP22 is set up. If this connection is not established, a second (further) data record of the primary or secondary data records is read from the relevant list L1, L2 and a connection initiation is started. If no further data record exists within the list L1, L2, the procedure restarts with the first data record of the list L1, L2.

Alternatively, if no further data record exists, following a predefined pause time, during which the telecommunications connection set-up is temporarily impossible (e.g., interruption of the telecommunications connection set-up), the procedure can restart with the first data record.

The invention claimed is:

1. A method for controlling the selection of base stations in a cellular radio telecommunications system, the method comprising the steps of:

operating, in at least one radio cell of the radio telecommunications system, at least one base station and at least one radio device for the purposes of wireless telecommunication;

supporting at least one first service and one second service by the radio device;

storing connection-relevant data in at least one memory via the radio device;

signaling to the radio device, via the at least one base station, in system information, which service the at least one base station supports;

storing primary data records of the at least one base station, via the radio device, in the form of a first list in the memory, if the at least one base station signals to the radio device in the system information that the at least one base station supports the first service;

storing secondary data records of the at least one base station, via the radio device, in the form of a second list, if the at least on base station signals to the radio device in the system information that the at least one base station supports the second service; and updating at least one of the first list and the second list, via the radio device, if the data of the at least one base station is modified.

2. A method for controlling the selection of base stations in a cellular radio telecommunications system as claimed in claim 1, wherein the primary and secondary data records of the at least one base station stored in the first and second lists are arranged according to transmission characteristics of the at least one base station.

3. A method for controlling the selection of base stations in a cellular radio telecommunications system as claimed in claim 1, wherein the primary and secondary data records of the at least one base station stored in the first and second lists are arranged at least according to an ordering criterion based on a type of data store.

4. A method for controlling the selection of base stations in a cellular radio telecommunications system as claimed in claim 1, wherein the primary and secondary data records of the at least one base station stored in the first and second lists are arranged in a sequence of their respective occurrence.

5. A method for controlling the selection of base stations in a cellular radio telecommunications system as claimed in claim 1, the method further comprising the steps of:

reading out a first data record, via the radio device, of the primary data records when the radio device sets up a telecommunications connection to the at least one base station which supports the first service;

reading out a first data record, via the radio device, of the secondary data records when the radio device sets up a telecommunications connection to the at least one base station which supports the second service;

reading out a second data record, via the radio device and if the connection set up fails, from one of the primary and the secondary data records in the respective lists and setting up a connection to the corresponding at least one base station via the radio device; and restarting the read out of the first data record of the respective list, via the radio device, if no connection has yet been set up and the second data record was the last data record in the respective list.

6. A method for controlling the selection of base stations in a cellular radio telecommunications system as claimed in claim 1, the method further comprising the steps of:

reading out a first data record of the primary data records, via the radio device, when the radio device sets up a telecommunications connection to the at least one base station which supports the first service;

reading out a first data record of the secondary data records, via the radio device, when the radio device sets up a telecommunications connection to the at least one base station which supports the second service;

reading out a second data record from one of the primary and the secondary data records in the respective list, via the radio device and if the connection set up fails, and setting up a connection to the corresponding at least one base station via the radio device; and restarting the read out of the first data record of the respective list at an end of a predefined pause time, via the radio device, if no connection has yet been set up and the second data record was the last data record in the respective list.

7. A method for controlling the selection of base stations in a cellular radio telecommunications system as claimed in claim 1, wherein the radio device is a radio network termination.

8. A method for controlling the selection of base stations in a cellular radio telecommunications system as claimed in claim 1, the method further comprising the step of:

allocating, given a plurality of radio cells in the radio telecommunications system, the same radio ranges to the radio cells.

9. A method for controlling the selection of base stations in a cellular radio telecommunications system as claimed in claim 8, wherein the radio telecommunications system operates according to the DECT standard.

10. A method for controlling the selection of base stations in a cellular radio telecommunications system as claimed in claim 1, the method further comprising the step of:

allocating, given a plurality of radio cells in the radio telecommunications system, different radio ranges to the radio cells.

11. A method for controlling the selection of base stations in a cellular radio telecommunications system as claimed in claim 10, wherein the radio telecommunications system operates according to the UMTS standard.

12. A method for controlling the selection of base stations in a cellular radio telecommunications system as claimed in claim 10, wherein the same type of data is transmitted in the first service and in the second service, and the first service and the second service are made available in different radio cells.

13. A method for controlling the selection of base stations in a cellular radio telecommunications system as claimed in claim 1, wherein different types of data are transmitted in the first service and in the second service.

* * * * *